(12) United States Patent
Uchiyama et al.

(10) Patent No.: US 10,212,324 B2
(45) Date of Patent: Feb. 19, 2019

(54) POSITION DETECTION DEVICE, POSITION DETECTION METHOD, AND STORAGE MEDIUM

(71) Applicant: CANON KABUSHIKI KAISHA, Tokyo (JP)

(72) Inventors: Hiroyuki Uchiyama, Kawasaki (JP); Kotaro Yano, Tokyo (JP); Ichiro Umeda, Tokyo (JP); Muling Guo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 15/363,248

(22) Filed: Nov. 29, 2016

(65) Prior Publication Data

US 2017/0154424 A1   Jun. 1, 2017

(30) Foreign Application Priority Data

Dec. 1, 2015   (JP) .................................. 2015-235044

(51) Int. Cl.
*G06T 7/00* (2017.01)
*H04N 5/232* (2006.01)
(Continued)

(52) U.S. Cl.
CPC .............. *H04N 5/232* (2013.01); *G01S 3/00* (2013.01); *G06K 9/46* (2013.01); *G06T 7/292* (2017.01);
(Continued)

(58) Field of Classification Search
CPC ...... G01S 3/00; H04N 5/247; H04N 5/23229; H04N 5/232; G06T 2207/30196; G06T 7/73; G06T 7/62; G06T 7/292; G06K 9/46
See application file for complete search history.

(56) References Cited

U.S. PATENT DOCUMENTS

2008/0129825 A1* 6/2008 DeAngelis ......... A63B 24/0021
                                                      348/169
2009/0167866 A1* 7/2009 Lee ...................... G06K 9/3233
                                                      348/159
(Continued)

FOREIGN PATENT DOCUMENTS

JP    2010-63001 A    3/2010
JP    2014-238674 A   12/2014
WO    10/126071 A1   11/2010

OTHER PUBLICATIONS

Zhengyou Zhang; "A Flexible New Technique for Camera Calibration;" IEEE Transactions on Pattern Analysis and Machine Intelligence, 22(11):1330-1334, 2000; Dec. 2, 1998; pp. 1-21.

(Continued)

*Primary Examiner* — Yon J Couso
(74) *Attorney, Agent, or Firm* — Canon U.S.A., Inc. IP Division

(57) ABSTRACT

An image processing device includes a detection unit configured to detect an object from an image captured by each of a plurality of image capturing devices, a determination unit configured to determine whether the object is detected by two image capturing devices or more in the image capturing devices, a first estimation unit configured to estimate, when the object have been detected by the two image capturing devices or more, a three-dimensional position and information on a height of the object based on a detected position where the object is detected in an image captured for each of the two image capturing devices and positions and orientations of the two image capturing devices, and a second estimation unit configured to estimate, when the object have been detected by a single image capturing device, the three-dimensional position of the object.

19 Claims, 17 Drawing Sheets

(51) Int. Cl.
  *G06K 9/46* (2006.01)
  *G01S 3/00* (2006.01)
  *H04N 5/247* (2006.01)
  *G06T 7/73* (2017.01)
  *G06T 7/292* (2017.01)
  *G06T 7/62* (2017.01)

(52) U.S. Cl.
  CPC .................. *G06T 7/62* (2017.01); *G06T 7/73* (2017.01); *H04N 5/23229* (2013.01); *H04N 5/247* (2013.01); *G06T 2207/30196* (2013.01)

(56) References Cited

U.S. PATENT DOCUMENTS

| | | | | |
|---|---|---|---|---|
| 2012/0051598 | A1* | 3/2012 | Ikeda | G01B 11/002 382/103 |
| 2014/0079282 | A1* | 3/2014 | Marcheselli | G06K 9/00335 382/103 |
| 2016/0086033 | A1* | 3/2016 | Molin | G06K 9/00671 345/419 |

OTHER PUBLICATIONS

Pierre Moulon, et al.; "Adaptive Structure from Motion with a Contrario Model Estimation;" Université Paris—Est, LIGM (UMR CNRS), Center for Visual Computing, ENPC; ACCV 2012; pp. 1-14.

Michael D. Breitenstein, et al.; "Robust Tracking-by-Detection Using a Detector Confidence Particle Filter;" 2009 IEEE 12th International Conference on Computer Vision (ICCV); pp. 1515-1522.

\* cited by examiner

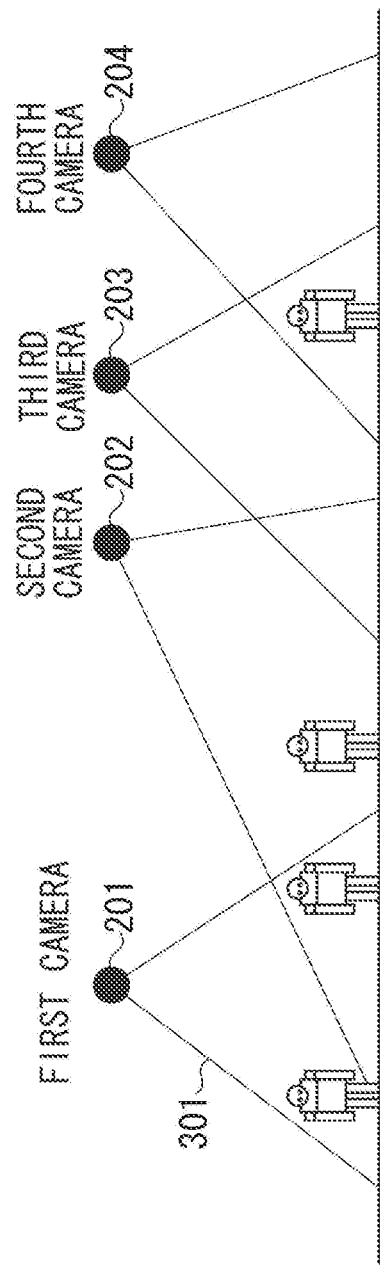

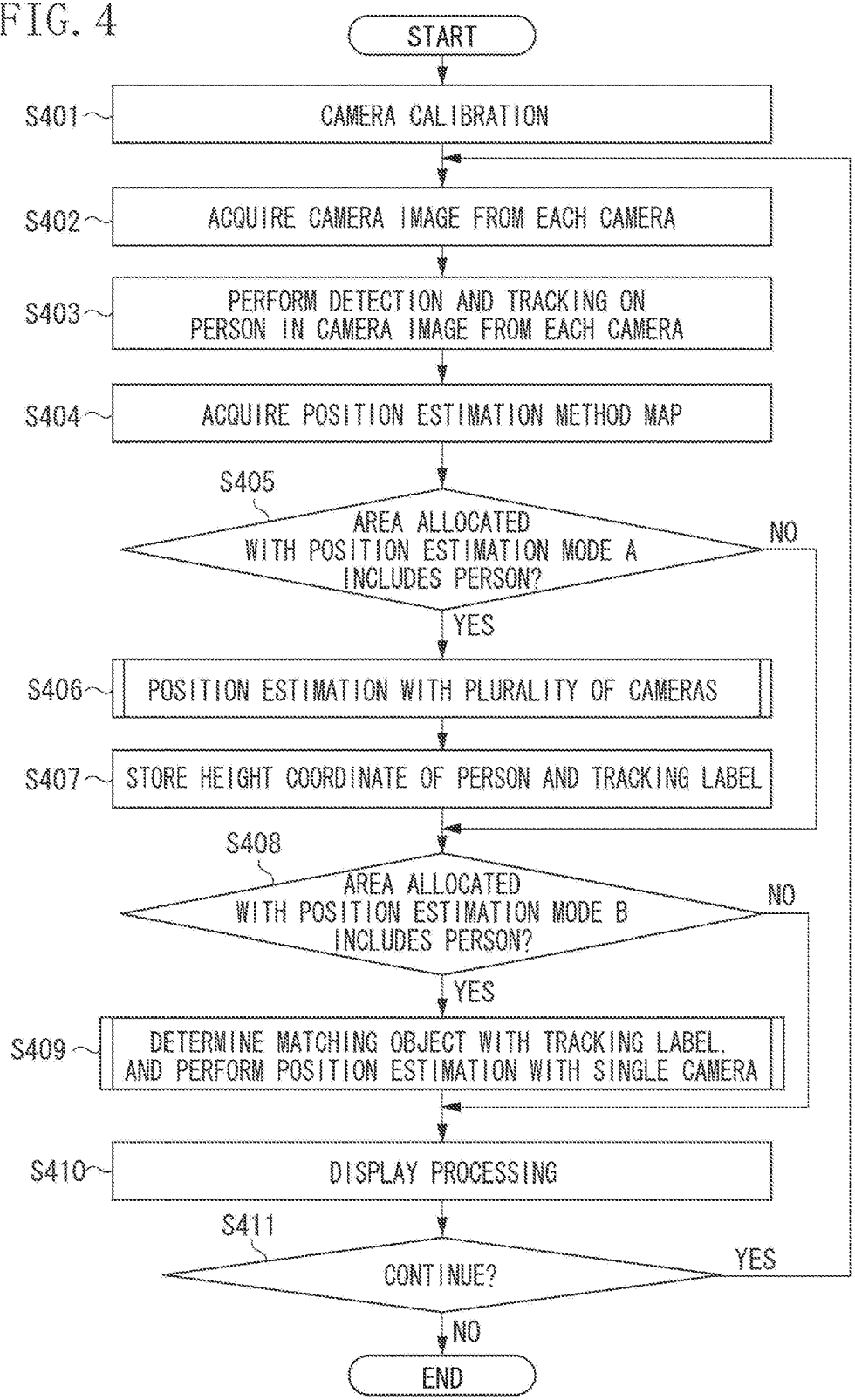

FIG. 8
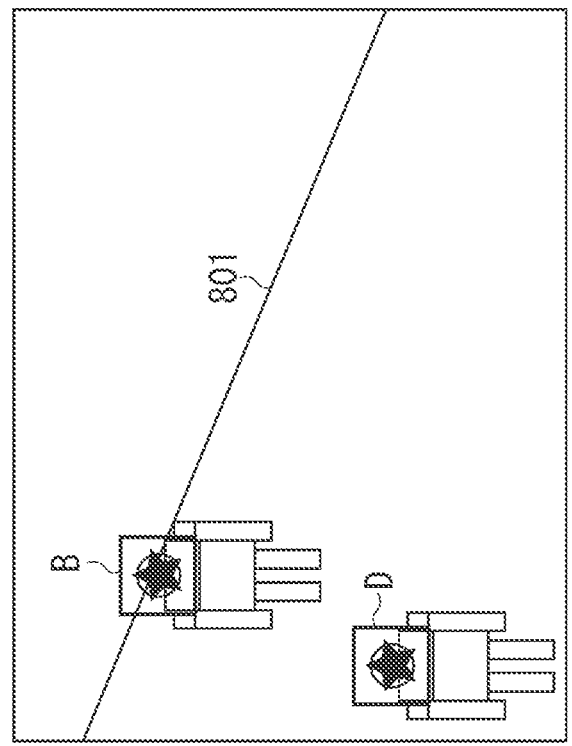
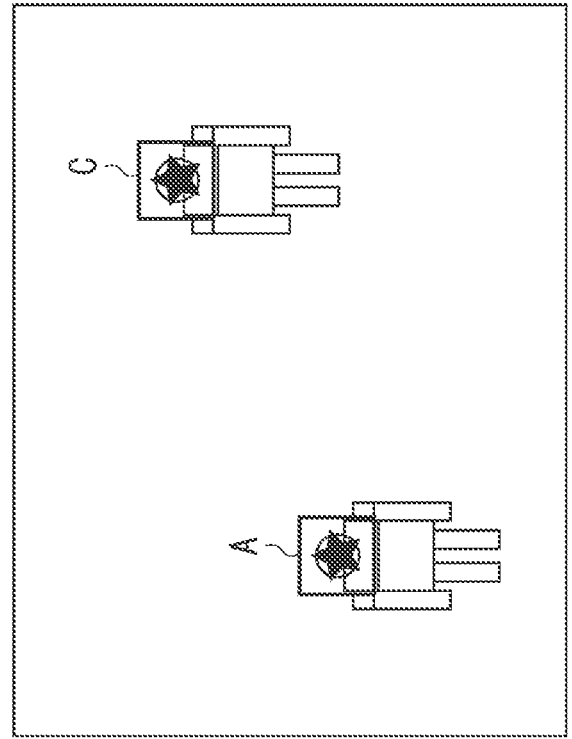

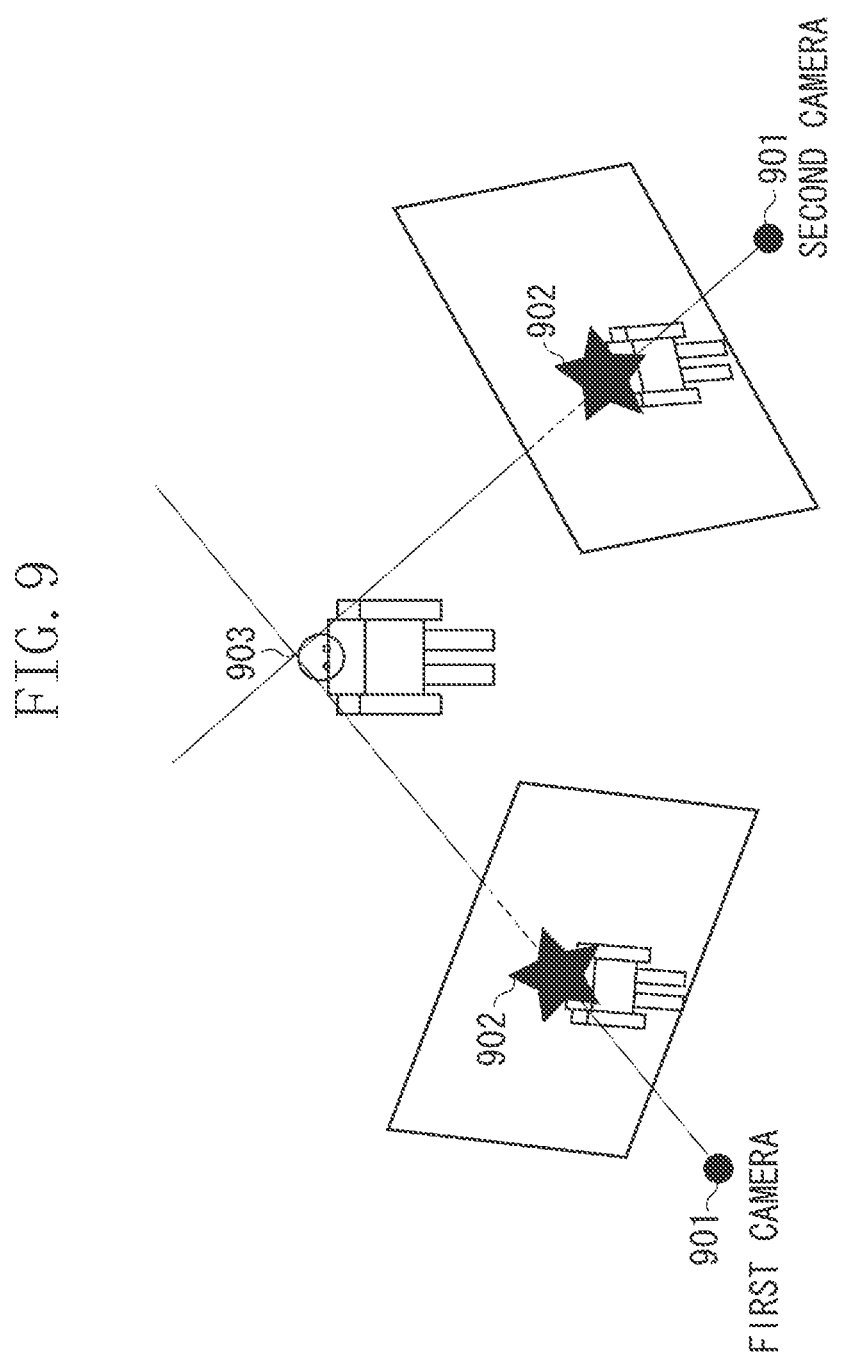

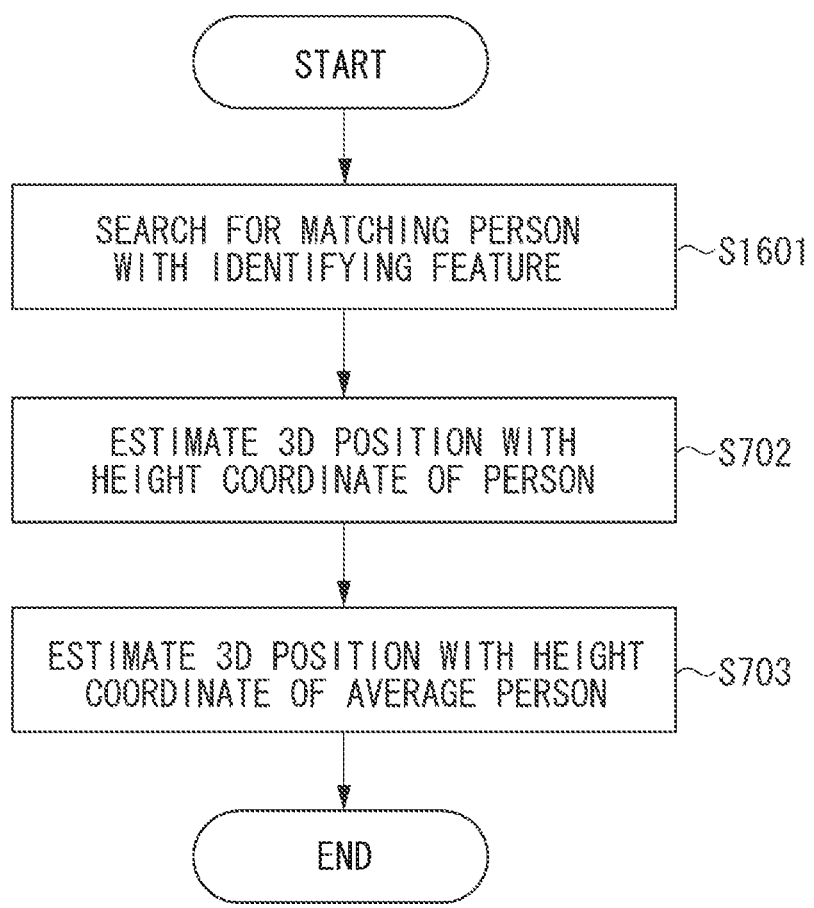

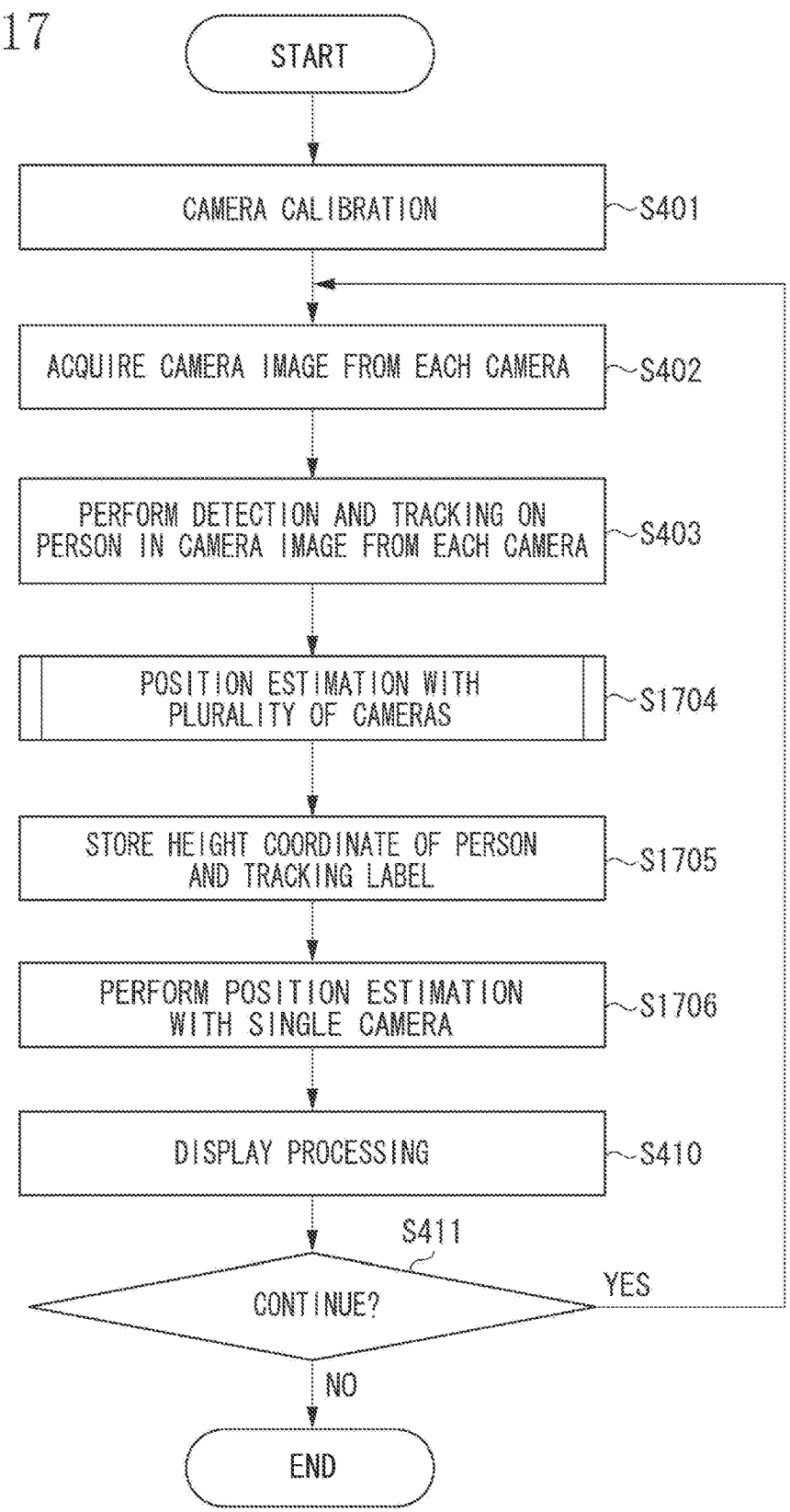

POSITION DETECTION DEVICE, POSITION DETECTION METHOD, AND STORAGE MEDIUM

BACKGROUND OF THE INVENTION

Field of the Invention

The aspect of the embodiments relates to a position detection device, a position detection method, and a storage medium that are particularly suitable to be used for acquiring a three-dimensional position of an object with a plurality of cameras.

Description of the Related Art

One method is conventionally known where a plurality of cameras is arranged in a monitoring area in a monitoring camera system and simultaneously captures the same object, so that a three-dimensional (hereinafter, referred to as 3D) position of the object can be estimated. For example, Japanese Patent Application Laid-Open No. 2011-511427 and Japanese Patent Application Laid-Open No. 2008-228582 each discuss a method of utilizing stereoscopy to estimate the 3D position of an object based on positions and orientations of cameras and a position of the object on a camera image. Japanese Patent Application Laid-Open No. 2014-238674 discusses a method of estimating a standing position of a person by using an average height of persons determined in advance and a camera parameter obtained by performing camera calibration.

As described above, in the method in each of PCT International Publication No. WO/126071 and Japanese Patent Application Laid-Open No. 2010-63001, stereoscopy is utilized to estimate the 3D position of the object with the plurality of cameras. In a situation where an object is monitored with a single camera alone, the stereoscopy is difficult to utilize, and thus accuracy in the estimation of the position of the object is low.

For example, the situation where the object is monitored with a single camera alone arises when a small number of cameras is arranged in a monitoring area. In such a case, the monitoring area is likely to include portions where fields of view of a plurality of cameras do not overlap. The situation where the object is monitored with a single camera alone might arise even when the fields of view of the plurality of cameras overlap, due to object detection failure or because an object is hidden by another object. Thus, a large number of cameras is to be arranged in the monitoring area to prevent the situation where the object is monitored with a single camera alone from arising.

In the method discussed in Japanese Patent Application Laid-Open No. 2014-238674, the standing position is estimated by using the average height of persons determined in advance. Thus, the accuracy in the estimation of the object position is largely degraded when a person with a body frame significantly different from the average or a child is monitored. Furthermore, the position estimation error increases as a straight line, connecting between the camera and the head of a person, becomes closer to being horizontal, even when the person has an average height.

SUMMARY OF THE INVENTION

According to an aspect of the embodiments, an image processing device includes a detection unit configured to detect an object from an image captured by each of a plurality of image capturing devices, a determination unit configured to determine whether the object is detected by two image capturing devices or more in the image capturing devices, a first estimation unit configured to estimate, when the object is determined to have been detected by the two image capturing devices or more, a three-dimensional position and information on a height of the object based on a detected position where the object is detected in an image captured for each of the two image capturing devices and positions and orientations of the two image capturing devices, and a second estimation unit configured to estimate, when the object is determined to have been detected by a single image capturing device in the image capturing devices, the three-dimensional position of the object based on a detected position in an image captured by the image capturing device that has detected the object, a position and an orientation of the single image capturing device, and the information on the height estimated by the first estimation unit.

Further features of the aspect of the embodiments will become apparent from the following description of exemplary embodiments with reference to the attached drawings.

BRIEF DESCRIPTION OF THE DRAWINGS

FIG. 3 is a diagram illustrating a positional relationship among four cameras according to the first exemplary embodiment.

FIG. 4 is a flowchart illustrating an example of a procedure of acquiring a three-dimensional position of an object, according to the first exemplary embodiment.

FIG. 8 is a diagram illustrating how a matching person is determined in camera images.

FIG. 9 is a diagram illustrating a method of estimating the three-dimensional position of the object.

FIG. 16 is a flowchart illustrating in detail an example of a procedure of estimating the three-dimensional position of the object outside the field of view overlapping image area, according to the second exemplary embodiment.

FIG. 17 is a flowchart illustrating an example of a procedure of acquiring a three-dimensional position of an object according to a third exemplary embodiment.

DESCRIPTION OF THE EMBODIMENTS

Exemplary embodiments of the disclosure are described below with a person as an example of a detection target object. Alternatively, the exemplary embodiments may be applied to other detection target objects such as a vehicle or an animal.

Figure 2:
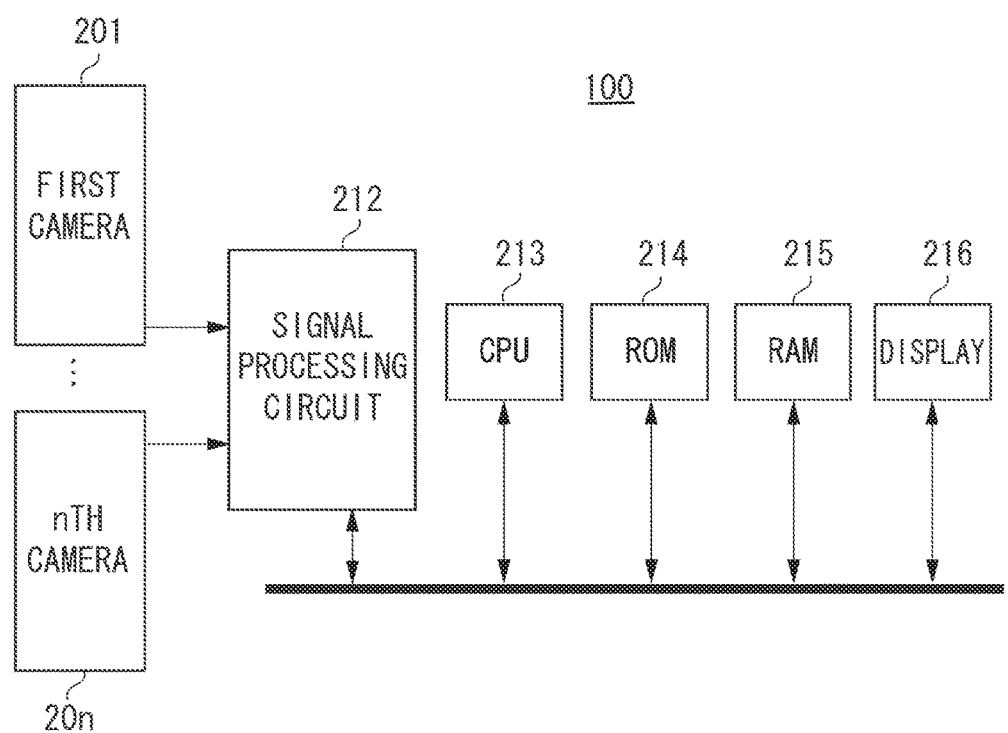
FIG. 2 is a block diagram illustrating an example of a hardware configuration of the position detection device according to exemplary embodiments.

FIG. 2 is a diagram illustrating an example of a hardware configuration of a position detection device 100 according to a first exemplary embodiment.

In FIG. 2, a first camera 201 to an nth camera 20n are each a camera including a charged coupling device (CCD), a complementally metal oxide semiconductor (CMOS), or the like, and including an imaging element for converting light representing a subject image, into an electrical signal. The first camera 201 to the nth camera 20n include two or more cameras. A signal processing circuit 212 processes time-series signals related to the subject image, acquired from the first camera 201 to the nth camera 20n. Thus, the time-series signal is converted into a digital signal.

A central processing unit (CPU) 213 executes a control program stored in a read only memory (ROM) 214, and thus controls the position detection device 100 as a whole. The ROM 214 stores the control program executed by the CPU 213, various types of parameter data, and the like. When the control program is executed by the CPU 213, the position detection device 100 functions as various units executing various types of processing illustrated in a flowchart described below. A random access memory (RAM) 215 stores image data, various types of information, and the like. The RAM 215 functions as a work area for the CPU 213 and a temporary save area of data. A display 216 displays an image and various types of information.

In the present exemplary embodiment, processing corresponding to each step in the flowchart described below is implemented with software, by using the CPU 213. It should be noted that the processing may be partially or entirely implemented with hardware such as an electronic circuit. The position detection device 100 according to the present exemplary embodiment may be implemented with a general personal computer (PC) and without the first camera 201 to the nth camera 20n as well as the signal processing circuit 212, or may be implemented as a dedicated device.

Figure 1:
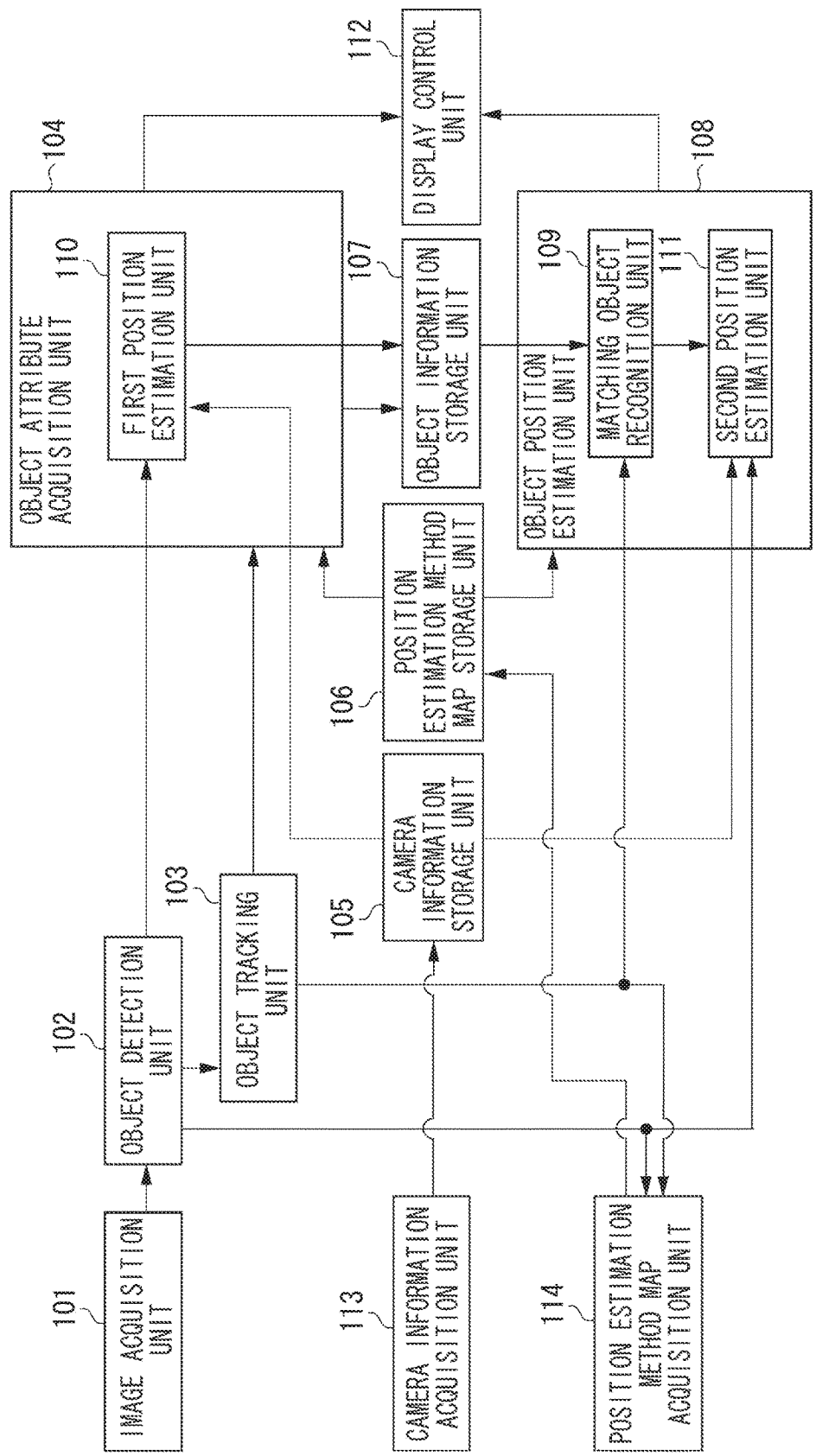
FIG. 1 is a block diagram illustrating an example of a functional configuration of a position detection device according to a first exemplary embodiment.

FIG. 1 is a block diagram illustrating an example of a functional configuration of the position detection device 100 according to the present exemplary embodiment. In FIG. 1, the position detection device 100 includes an image acquisition unit 101, an object detection unit 102, an object tracking unit 103, an object attribute acquisition unit 104, a camera information storage unit 105, and a position estimation method map storage unit 106. The position detection device 100 further includes an object information storage unit 107, an object position estimation unit 108, a display control unit 112, a camera information acquisition unit 113, and a position estimation method map acquisition unit 114.

The camera information acquisition unit 113 performs camera calibration to acquire setting information (camera information) related to an intrinsic parameter, a position, and an orientation of each of the first camera 201 to the nth camera 20n, and stores the information in the camera information storage unit 105.

The image acquisition unit 101 acquires image data (hereinafter, referred to as a camera image) from each of the first camera 201 to the nth camera 20n.

The object detection unit 102 detects an object in the camera image acquired by the image acquiring unit 101. In the present exemplary embodiment, the object to be detected is a person.

The object tracking unit 103 tracks the object, in the camera image, detected by the object detection unit 102. The object tracking unit 103 provides a tracking label, for identifying the matching object, to a tracked object. In the present exemplary embodiment, a method of estimating the position of a person is switched in accordance with a position of the head of a person, in the camera image, detected by the object detection unit 102.

As will be described later, the position estimation method map storage unit 106 stores a condition for switching the method of estimating the position of a person.

The object attribute acquisition unit 104 acquires information on a height of the object, based on the camera information stored in the camera information storage unit 105 and a detection result obtained by the object detection unit 102. The height of the object is represented by a coordinate of a position of a representative point of the object in a height direction, based on a floor surface. The representative point may not necessarily be the highest point of the object, and is a center of the head of a person in the present exemplary embodiment. In the present exemplary embodiment, the object attribute acquisition unit 104 acquires the information on the height of the object. Alternatively, the object attribute acquisition unit 104 may acquire information on the size of the object.

The object attribute acquisition unit 104 includes a first position estimation unit 110. The first position estimation unit 110 estimates a three-dimensional (hereinafter, referred to as 3D) position of the object based on the camera information stored in the camera information storage unit 105 and the detection result obtained by the object detection unit 102 for each of the first camera 201 to the nth camera 20n.

The object information storage unit 107 stores object information including the information related to the height of an object acquired by the object attribute acquisition unit 104.

The object position estimation unit 108 estimates the 3D position of the object based on the camera information stored in the camera information storage unit 105, the detection result obtained by the object detection unit 102, a tracking result obtained by the object tracking unit 103, and the object information stored in the object information storage unit 107. The object position estimation unit 108 includes a matching object recognition unit 109 and a second position estimation unit 111.

The matching object recognition unit 109 determines whether the information of the object detected by the object detection unit 102 matches the object information stored in the object information storage unit 107. The second position estimation unit 111 calculates the 3D position of the object based on the camera information stored in the camera information storage unit 105, the detection result obtained by the object detection unit 102, and the object information stored in the object information storage unit 107.

The display control unit 112 performs control in such a manner that the detection result and the 3D position of the object are displayed on the display 216 together with the camera image.

FIG. 4 is a flowchart illustrating processing according to the present exemplary embodiment. In the present exemplary embodiment, four cameras are arranged with fields of view overlapped. More specifically, in the present exemplary embodiment, as illustrated in FIG. 3, a first camera 201 to a fourth camera 204 are arranged with fields of view 301 partially overlapped. The number of cameras is not limited to this, and may be any number larger than one.

First of all, in step S401, the camera information acquisition unit 113 performs the camera calibration to acquire the information on the intrinsic parameter, the position, and the orientation of each of the first camera 201 to the fourth camera 204. In this example, the intrinsic parameter is a focal length of the camera that is used together with the position and the orientation of the camera to estimate the position of the object as described below.

Figure 5A:
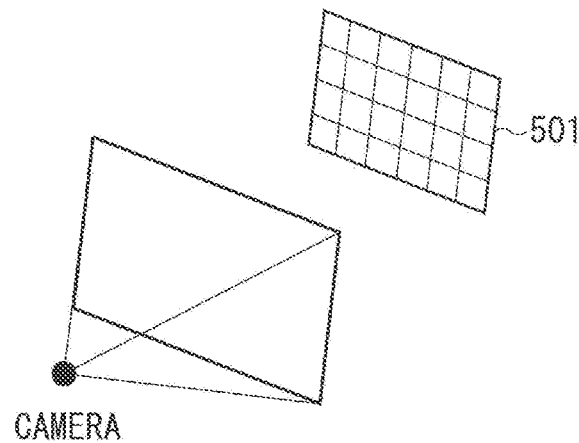
FIGS. 5A and 5B are each a diagram illustrating an overview of calibration.
Figure 5B:
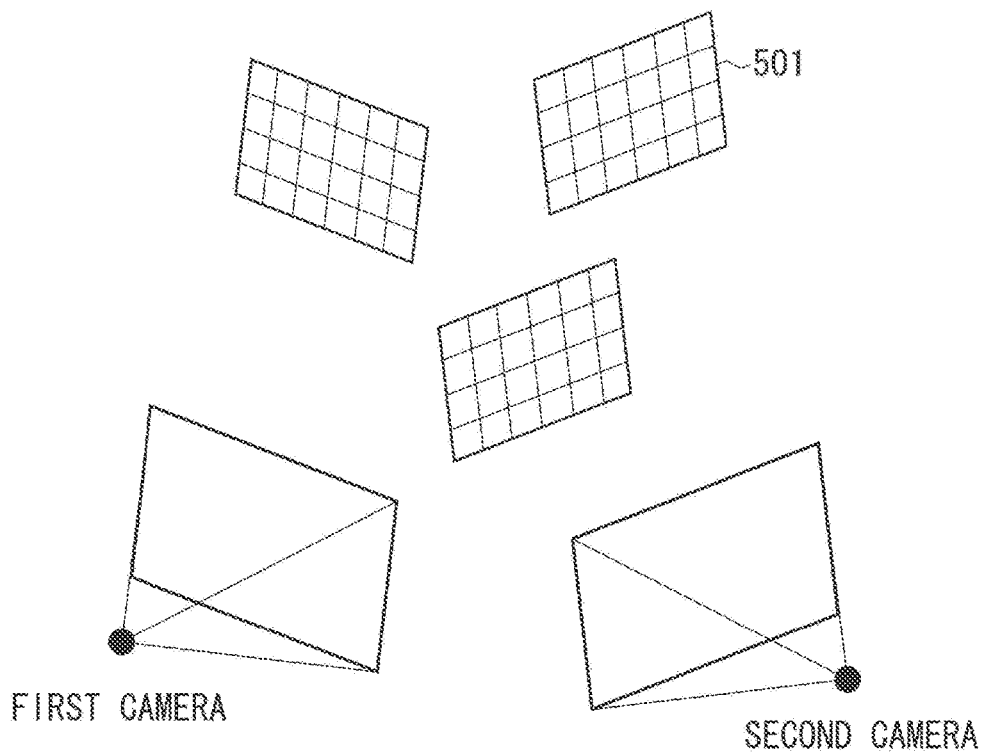

FIGS. 5A and 5B are each a diagram illustrating an overview of the calibration. First of all, as illustrated in FIG. 5A, a calibration board 501 is positioned in an environment, and the intrinsic parameter of each camera is calculated through a method described in Zhengyou Zhang "A Flexible New Technique for Camera Calibration", IEEE Transactions on Pattern Analysis and Machine Intelligence, 22(11): 1330 to 1334, 2000, for example. Then, as illustrated in FIG. 5B, a plurality of the calibration boards 501 positioned in the environment are simultaneously monitored by a plurality of cameras, whereby the positions and the orientations of the cameras are estimated. The camera information acquisition unit 113 stores the camera information acquired through such a procedure in the camera information storage unit 105.

In the present exemplary embodiment, the positions and the orientations of the cameras are estimated by using the plurality of calibration boards positioned in the environment. Alternatively, the information on the position and the orientation of the camera may be acquired through a method described in Pierre Moulon, Pascal Monasse, and Renaud Marlet "Adaptive structure from motion with a contrario model estimation" ACCV 2012. More specifically, feature points such as a corner or feature points obtained by a scale-invariant feature transform (SIFT) feature in a camera image from each camera are extracted. A group of such feature points is matched between the camera images. Then, the positions and the orientations of the cameras, as well as the positions of the group of points are obtained. Thus, the positions and the orientations of the cameras are acquired. The intrinsic parameter of the camera may be calculated together with the positions and the orientations of the cameras.

In step S402, the image acquisition unit 101 acquires a camera image, corresponding to a frame unit, from each of the first camera 201 to the fourth camera 204. In the present exemplary embodiment, the number of cameras is four, and thus four camera images are acquired.

Then, in step S403, the object detection unit 102 detects a person in the camera image acquired in step S402. The object tracking unit 103 tracks the person based on the detection result for the person in the camera image that has been acquired in the past. In this processing, first of all, the object detection unit 102 acquires a head area of the person in the camera image. Through this processing, a representative point coordinates (x,y) of a rectangle as a person area, and a height h and a width w of the rectangle are obtained. Then, the object tracking unit 103 associates the current person area with the person area of the same person in the past. Thus, the matching person is tracked over a plurality of time points. As a result of the processing, a tracking label i is obtained for each person. The tracking label i is a code for identifying each tracked person. For example, a method of detecting and tracking the object includes a method described in M. D. Breitenstein et al., "Robust tracking-by-detection using a detector confidence particle filter", ICCV 2009.

Next, in step S404, the position estimation method map acquisition unit 114 acquires a position estimation method map, and stores the position estimation method map in the position estimation method map storage unit 106. The position estimation method map is a multi-valued image used for switching the method of estimating the three-dimensional position of a person in accordance with the position of the head of the person in the camera image obtained from each camera. The position estimation method map acquisition unit 114 acquires the position estimation method map by acquiring information on an image area (hereinafter, referred to as a field of view overlapping image area) where the fields of view of the cameras overlap.

Figure 10A:
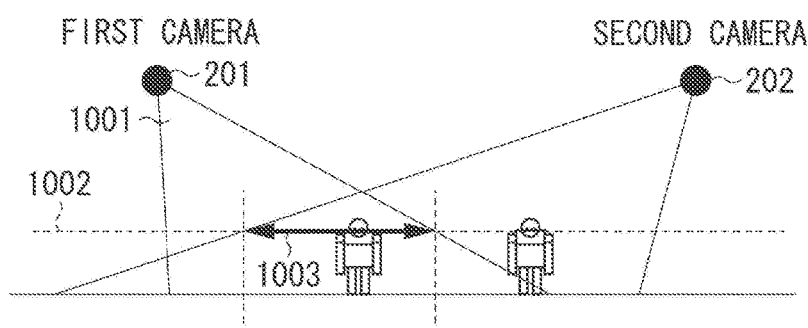
FIGS. 10A, 10B, and 10C are each a diagram illustrating a method of acquiring the field of view overlapping image area.
Figure 10B:
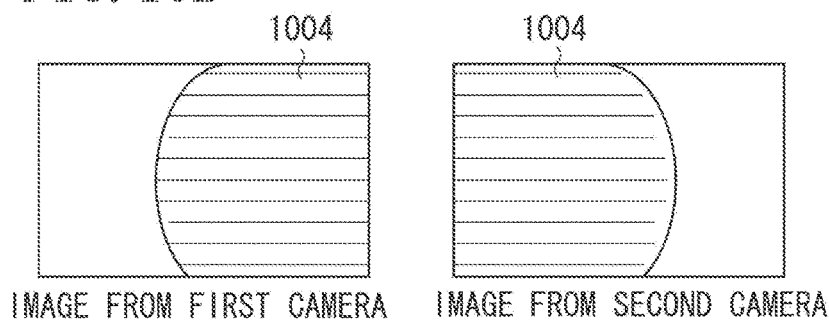
Figure 10C:
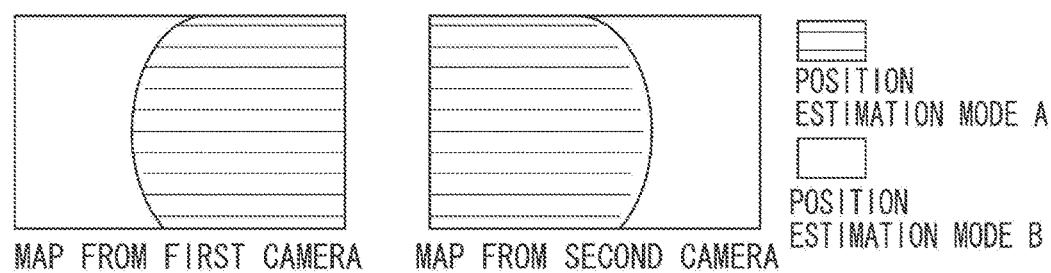

FIGS. 10A-10C are each a diagram illustrating a method of acquiring the field of view overlapping image area. First of all, as illustrated in FIG. 10A, a field of view overlapping monitoring area 1003 is set as a plane area where a plane 1002 at an average height of persons intersects with a 3D area where the portions of view volumes 1001 of a plurality of cameras intersect. In the present exemplary embodiment, the average height of persons has a predetermined value set in advance. Alternatively, the average height of persons may be statistically obtained while the system is operating.

Next, as illustrated in FIG. 10B, in a camera image captured by each camera, an image area corresponding to the field of view overlapping monitoring area 1003 is obtained, and is set as a field of view overlapping image area 1004. As illustrated in FIG. 10C, the field of view overlapping image area 1004 is allocated with a position estimation mode A, whereas an area outside the field of view overlapping image area 1004 is allocated with a position estimation mode B. Such allocation is performed for all the camera images.

In the present exemplary embodiment, the position estimation method map is a multi-valued image. Alternatively, the position estimation method map may be represented by a combination of closed areas formed by a polygonal shape and curves, or in other ways. The position estimation method may be different among cameras instead of being different among partial areas in the images, and three or more position estimation methods may be employed. The position estimation method map and the field of view overlapping image area may be obtained in a manner different from that described above. For example, the position estimation method map or the field of view overlapping image area may be settable by the user.

As described above, the position estimation method map is acquired in step S404, and a method of estimating the 3D position is switched in accordance with the position estimation mode as described below. With the method of estimating the 3D position switched based on the position estimation method map, the persons that are processing targets in a position estimation method performed in each of steps S406 and S409 described later can be easily narrowed down, whereby a lower calculation cost can be achieved.

Next, in step S405, the object attribute acquisition unit 104 determines whether there is a person in the field of view overlapping image area that is the area allocated with the position estimation mode A in the position estimation method map. More specifically, whether the field of view overlapping image area includes the representative point coordinates (x,y) of the person is determined. When the result of the determination indicates that the field of view overlapping image area includes a person (Yes in step S405), the processing proceeds to step S406. On the other hand, when the result indicates that the field of view overlapping image area includes no person (No in step S405), the processing proceeds to step S408.

In step S406, the first position estimation unit 110 estimates the position of the person with a plurality of cameras. This processing is executed on the person in the area allocated with the position estimation mode A.

Figure 6:
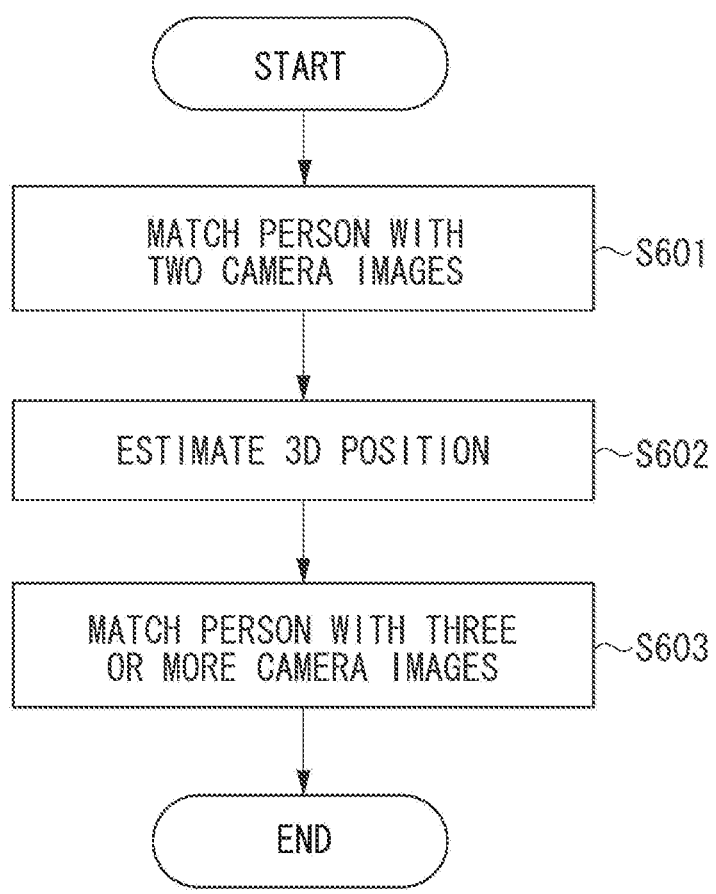
FIG. 6 is a flowchart illustrating in detail a procedure of estimating the three-dimensional position of the object in a field of view overlapping image area.

FIG. 6 is a flowchart illustrating in detail an example of a procedure of processing executed in step S406 by the first position estimation unit 110.

First of all, in step S601, the person, detected in step S403, is matched between two camera images. Specifically, a person is detected in one camera image, and a matching person is searched in another camera image.

The matching person in the camera images is determined by matching the representative points of the person areas with epipolar geometry. For example, the representative point of a person A in a first camera image illustrated in FIG. 8 is represented by a straight line called an epipolar line 801 in a second camera image. A fundamental matrix F including information on the positional relationship between the first and the second camera images can be calculated based on the positions, the orientations, and the intrinsic parameters of the cameras in the camera information stored in the camera information storage unit 105. The epipolar line l on the second camera image is represented by the following Formula (1):

$$l=Fx \qquad (1),$$

where x is a vector representing two dimensional coordinates of the person A in the first camera image.

When a distance between the representative point of a person in the second camera image and the epipolar line 801 is equal to or smaller than a predetermined value, the person in the second camera image matches the person in the first camera image. For example, in FIG. 8, the person A in the first camera image matches a person B in the second camera image. Then, sets of matching persons in the two camera images are generated. For example, in FIG. 8, the person A matches the person B, and a person C matches a person D, whereby information on a set {A, B} and a set {C, D} is generated. The processing in step S601 is executed in this manner for all the combinations of two cameras.

Next, in step S602, the first position estimation unit 110 estimates the 3D position of a person from the matching person set generated in step S601. Specifically, as illustrated in FIG. 9, a straight line, in a 3D space, passing through a camera center 901 and a representative point 902 in a person area is obtained for each camera image. The straight line can be obtained based on the position, the orientation, and the intrinsic parameter of the camera and coordinates of the representative point 902 on the image. Next, an intersecting point 903 between the straight lines corresponding to the cameras is obtained as the 3D position of the person. In actual cases, the straight lines might not intersect at a single point as described above due to an error in the estimation of the straight lines. In such a case, a point with the smallest sum of distances from the straight lines is used instead of the intersecting point.

Next, in step S603 the first position estimation unit 110 matches the objects with three or more cameras, based on the 3D position estimated in step S602. At the point of step S602, the 3D position of the same object is estimated as a plurality of points because the matching is only performed with the two cameras. Thus, in step S603, the plurality of points (3D position) of the same object is integrated into a single point. As described above, the processing in step S603 is executed only when three or more cameras are arranged, and thus needs not to be executed when only two cameras are arranged. First of all, a group with 3D positions, estimated in step S602, apart from each other by a distance that is not longer than a threshold is searched. The object matching between two camera images in the group is regarded as the object matching among multiple camera images. Then, an average of the 3D positions in the group is obtained, and is set as a representative 3D position of the group.

Referring back to FIG. 4, the object attribute acquisition unit 104 stores the height coordinate of a person as the object information in the object information storage unit 107 together with the tracking label of each corresponding camera. The height coordinate of a person is obtained from the 3D position of the person obtained in step S406.

Next, in step S408, the object position estimation unit 108 determines whether the area allocated with the position estimation mode B in the position estimation method map includes a person. When the result of the determination indicates that the area allocated with the position estimation mode B includes a person (Yes in step S408), the processing proceeds to step S409. On the other hand, when the area allocated with the position estimation mode B includes no person (No in step S408), the processing proceeds to step S410.

In step S409, the object position estimation unit 108 estimates the 3D position of the person in the area allocated with the position estimation mode B by using information on the person in the area allocated with the position estimation mode B and the height coordinate of the person stored in step S407.

Figure 7:
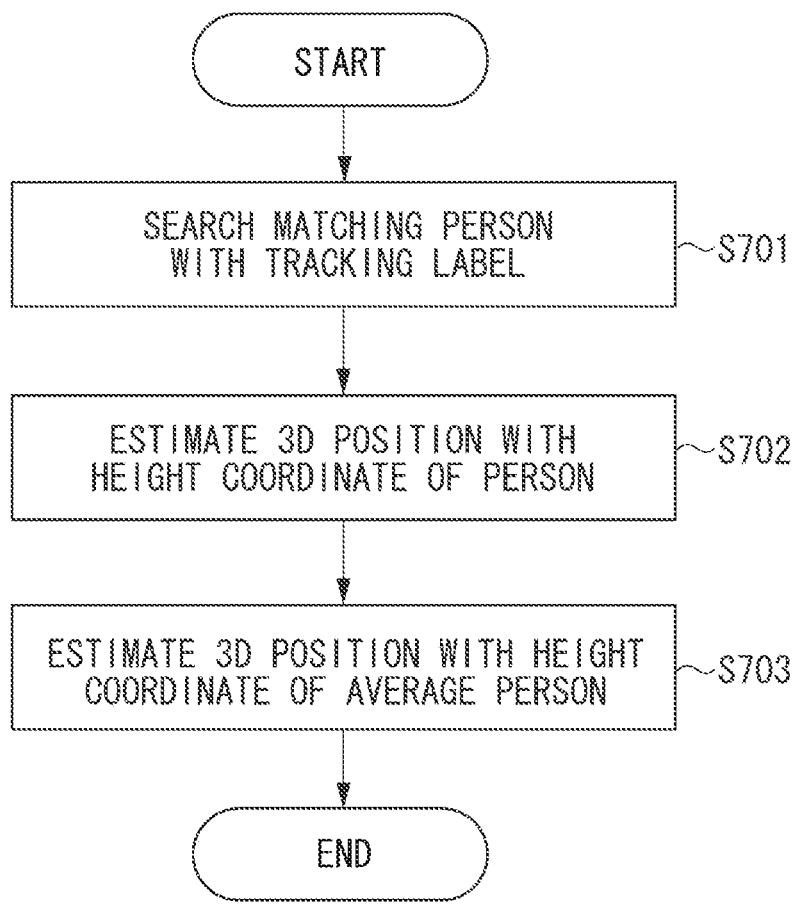
FIG. 7 is a flowchart illustrating in detail an example of a procedure of estimating a three-dimensional position of an object outside the field of view overlapping image area, according to the first exemplary embodiment.

FIG. 7 is a flowchart illustrating in detail an example of a procedure of the processing executed in step S409 by the object position estimation unit 108.

First of all, in step S701, the matching object recognition unit 109 acquires the height coordinate of each person in the area allocated with the position estimation mode B. Specifically, first of all, the tracking label, stored in the object information storage unit 107 together with the object information, is compared with the tracking label of the person in the area allocated with the position estimation mode B. In a case where a tracing label that is the same as the tracking label of the person in the area allocated with the position estimation mode B is included in the tracking label stored together with the object information in the object information storage unit 107, the person corresponding to the tracking label is regarded as the matching person. Then, the height coordinate of the person is acquired from the object information corresponding to the tracking label. When there is a plurality of height coordinates of a person that corresponds to the same tacking label (when the 3D position is estimated more than once in the area allocated with the position estimation mode A), the height coordinate of the person that is calculated first is acquired. When the tracking label that is the same as the tracking label of a person in the area allocated with the position estimation mode B is not stored in the object information storage unit 107, the height coordinate is not acquired for that person.

As described above, in step S701 in FIG. 7, the matching person is determined by tracking a person with the tracking label. Thus, the matching person can be determined even in a situation where the determination is difficult to be made with visual appearances. Example of such a situation include a case where there are persons with similar visual appearances in the monitoring area. Thus, the matching person can be determined with higher accuracy.

Next, in step S702, the second position estimation unit 111 estimates the 3D position of a person in the area allocated with the position estimation mode B, by using the height coordinate acquired in step S701. This processing is executed only for a person for which the height coordinate has been acquired in step S701.

Figure 11:
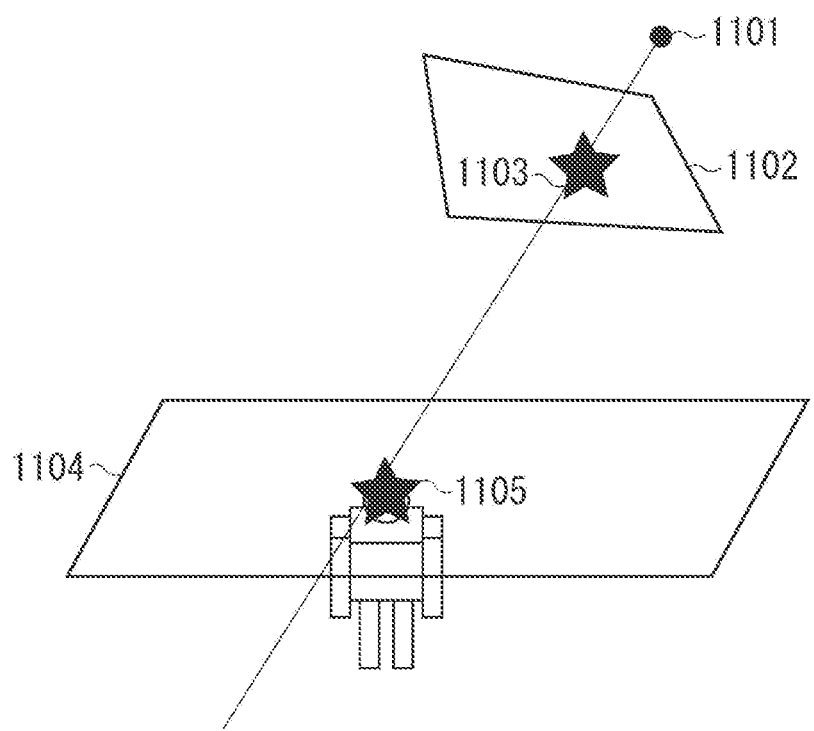
FIG. 11 is a diagram illustrating a method of estimating the three-dimensional position of an object from a height coordinate of the object.

FIG. 11 is a diagram illustrating a method of estimating the 3D position of the person in step S702. First of all, a straight line, in a 3D space, passing through a camera center 1101 and a position 1103 of the head of the person on a plane 1102 is obtained. Then, a virtual plane 1104 that is in parallel with the floor surface is set at the height corresponding to the height coordinate of the head of the person. Then, an intersecting point 1105 between the plane 1104 and the straight line 1101 is obtained as the estimated 3D position of the person.

Specifically, the 3D position of the person is obtained as follows. First of all, a ray vector r passing through the camera center and the position of the head of the person is calculated with the following Formula (2):

$$r = R^T \begin{pmatrix} u \\ v \\ f \end{pmatrix}.$$  (2)

In the formula, R represents a rotation matrix of the camera that is a known value obtained by the camera calibration, u and v represent the position of the head of the person in a camera coordinate system, and f represents a focal length converted into the scale of the camera coordinate system. Next, a 3D position X of the head of the person is obtained with the following Formula (3).

$$X = \alpha r + c$$  (3), where r is the ray vector, α is a certain real number, and c is a vector representing the camera position.

The value α is obtained by using the plane that is in parallel with the floor surface and is at the height corresponding to the height coordinate of the head of the person. Here, the following Formula (4) is established, $$h = \alpha r_z + c_z$$  (4), where h represents the height of the head of the person, $r_z$ represents a z component of the ray vector r, and $c_z$ represents a z component of the vector c.

The final 3D position X of the head of the person is calculated with the following Formula (5), obtained by substituting Formula (4) in Formula (3), $$X = \frac{h - c_z}{r_z} r + c.$$  (5)

Then, in step S703, the second position estimation unit 111 estimates the 3D position of a person for which the height coordinate has failed to be acquired in step S701, by using an average height coordinate of persons. The 3D position is estimated in this processing in a manner that is the same as that in step S702, except that a predetermined fixed value or a statistical value is used as the height coordinate of the person instead of the height coordinate of the person stored in the object information storage unit 107. In the present exemplary embodiment, a predetermined value is used as this height coordinate. Alternatively, this height coordinate may be a value obtained while the system is operating, such as an average of the height coordinates of the persons stored in the object information storage unit 107.

As described above, in step S703 in FIG. 7, the 3D position is estimated by using the average height coordinate of persons. Thus, the 3D position can be estimated even for a person for which information on the height coordinate has not been acquired.

Referring back to FIG. 4, in step S410, the display control unit 112 causes the display 216 to display a result of tracking a person and a result of estimating the 3D position obtained in the processing described above.

Figure 12:
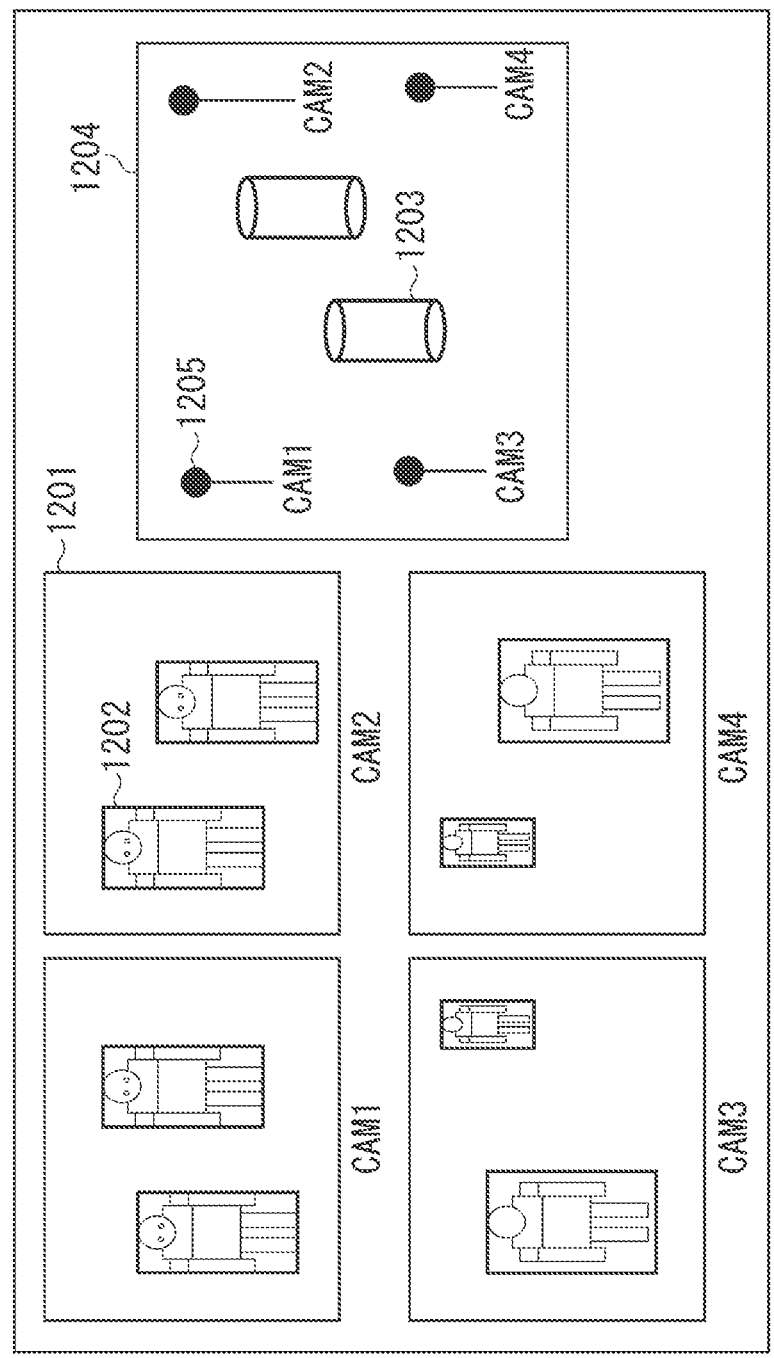
FIG. 12 is a diagram illustrating an example of a screen displaying a result of the processing.

FIG. 12 is a diagram illustrating an example of a screen displaying the results of the processing. As illustrated in FIG. 12, the screen has a structure including one or more camera images 1201 and a 3D map 1204.

Symbols (frames) 1202, each representing the person area tracked in step S403, are overlapped on the camera image 1201. The frames of the same person in different camera images are colored with the same color, so that the user can recognize the same person in different camera images.

On the 3D map 1204, symbols 1203 each representing the 3D position of a person and symbols 1205 each representing the position and the orientation of the camera are displayed as 3D images together with the floor surface. A person in the camera image 1201 and the same person in the 3D map 1204 are colored with the same color, so that the user can easily identify the same person in the camera image 1201 and the 3D map 1204.

Next, in step S411, the image acquisition unit 101 determines whether to continue the processing. When the result of the determination indicates that the camera image can be further acquired from the camera and thus the processing is to be continued (Yes in step S411), the processing returns to step S402. On the other hand, when the result indicates that no camera image can further be acquired, and thus the processing is to be terminated (No in step S411), the processing is terminated.

As described above, in the present exemplary embodiment, the 3D position can be estimated even when the object is monitored with a single camera alone, and the 3D position can be estimated with higher accuracy. The height of an individual object is used, and thus the position can be estimated with the height of the object that is close to the actual height. Thus, the 3D position can be estimated with higher accuracy.

In the present exemplary embodiment, the tracking label is stored in the object information storage unit 107 for determining the matching object. Alternatively, a scene-specific label may be stored in the object information storage unit 107 instead of such a camera-specific tracking label allocated to each camera. With the scene-specific label, the same label is allocated to the matching object in different camera images. For example, the matching object can be determined even when the tracking is interrupted on a camera image captured by a single camera and thus the tracking label changes. For example, the scene-specific label is generated as follows. When objects are matched with cameras in steps S601 and S603, tracking labels are also matched. Then, a certain scene-specific label is allocated to the group of matching tracking labels.

In the present exemplary embodiment, the position estimation maps are acquired in step S404 for switching between the position estimation methods depending on the position of a person. Thus, the position estimation method corresponding to the position estimation mode A or that corresponding to the position estimation mode B is performed. Alternatively, a position estimation mode of performing both position estimation methods may be provided. For example, in step S409, the 3D position may be estimated with both the position estimation modes A and B. Thus, the estimation can be performed with higher accuracy, especially when an object is monitored with a single camera alone due to detection failure or because the object is hidden by another object.

In the present exemplary embodiment, an object detection result obtained with one camera is input to both the object attribute acquisition unit 104 and the object position estimation unit 108. Alternatively, the result may be input to only one of the object attribute acquisition unit 104 and the object position estimation unit 108. For example, the object detection result obtained with one camera may be input to the object attribute acquisition unit 104, while the object detection result obtained with another camera is input to the object position estimation unit 108. Furthermore, a configuration may be employed in which results of some of the cameras are input to any one of the object attribute acquisition unit 104 and the object position estimation unit 108, and results of the remaining one of the cameras are input to both the object attribute acquisition unit 104 and the object position estimation unit 108.

A second exemplary embodiment of the disclosure is described below. In the present exemplary embodiment, only the differences from the first exemplary embodiment are described.

Figure 13:
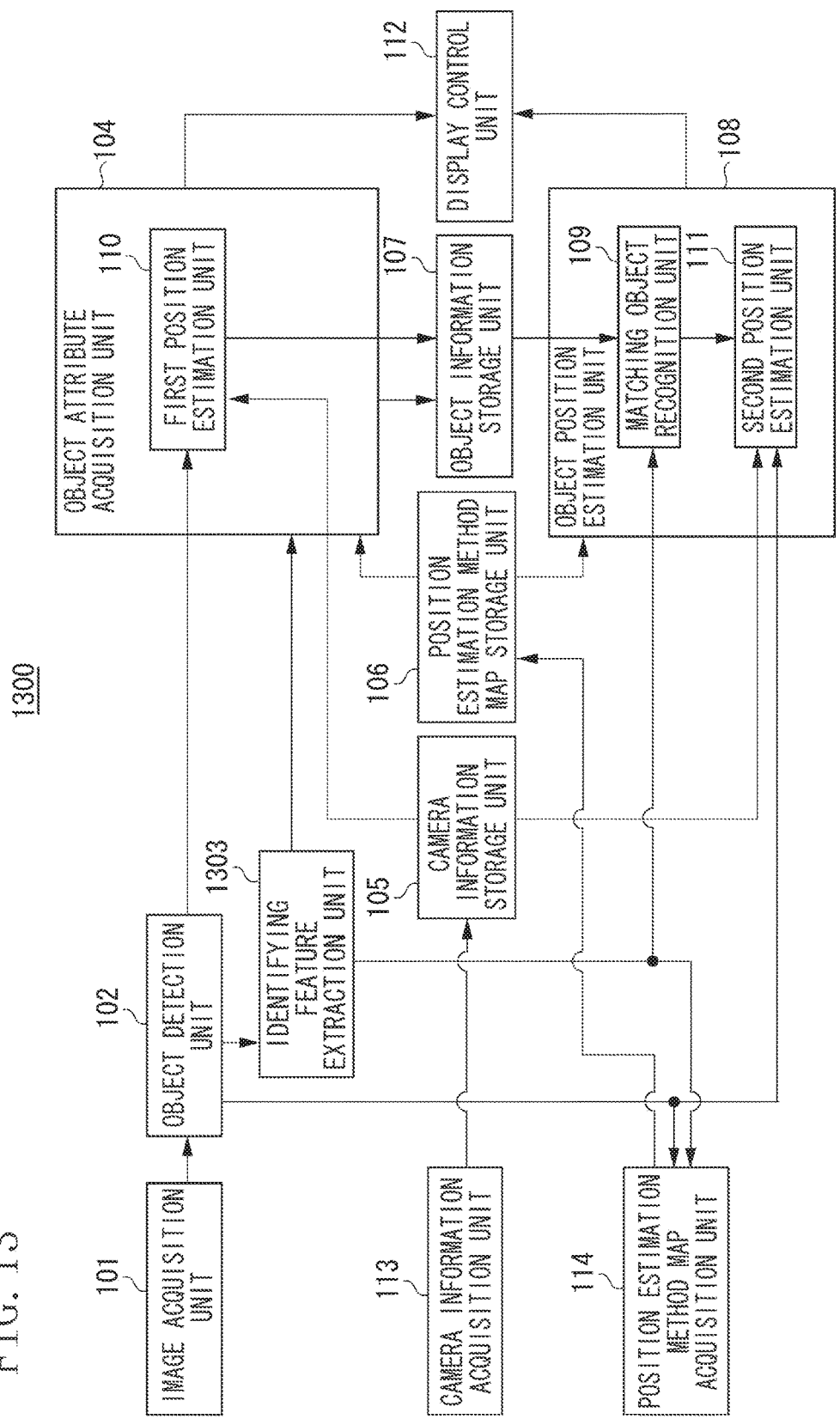
FIG. 13 is a block diagram illustrating an example of a functional configuration of a position detection device according to a second exemplary embodiment.

FIG. 13 is a block diagram illustrating an example of a functional configuration of a position detection device 1300 according to the present exemplary embodiment. As the difference from the configuration illustrated in FIG. 1, the object tracking unit 103 is replaced with an identifying feature extraction unit 1303.

The identifying feature extraction unit 1303 in FIG. 13 extracts an identifying feature from an object detected by the object detection unit 102. The identifying feature represents a feature amount used for determining whether object areas belong to the same object. In the present exemplary embodiment, a red/green/blue (RGB) value in a clothing area close to a lower end of the head area of the person is acquired as an RGB color feature. Alternatively, attribute information such as height, gender, age, clothing, or appearance, an image feature such as a Histogram of Oriented Gradients (HOG) feature, or even an image itself may be extracted as the identifying feature. The object position estimation unit 108 estimates the 3D position of the object based on the camera information stored in the camera information storage unit 105, the detection result obtained by the object detection unit 102, a result of extracting the identifying feature by the identifying feature extraction unit 1303, and the object information stored in the object information storage unit 107.

Figure 14:
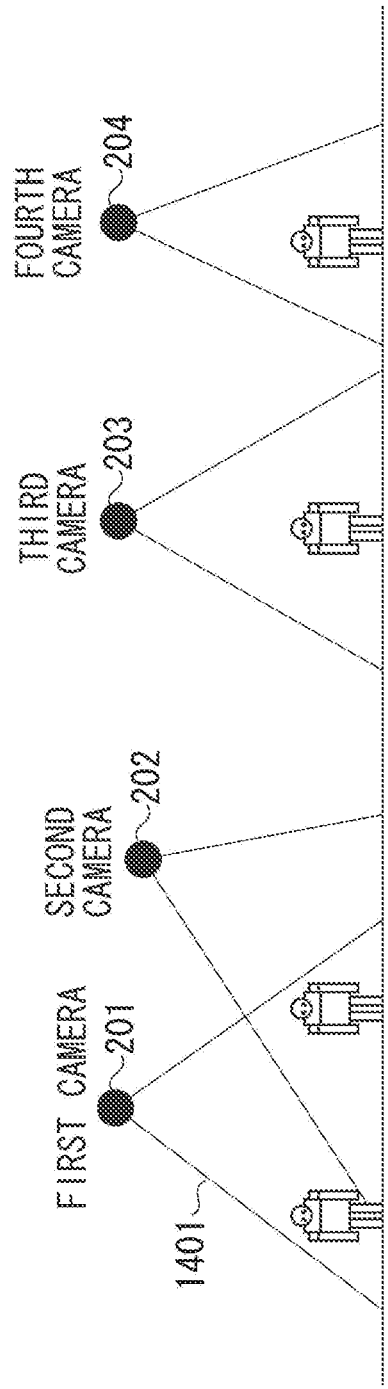
FIG. 14 is a diagram illustrating a positional relationship among four cameras according to the second exemplary embodiment.

FIG. 14 is a diagram illustrating an example of how the cameras are arranged in the present exemplary embodiment. In the example illustrated in FIG. 3, the field of view of each camera overlaps with the field of view of another camera. In the example illustrated in FIG. 14, the first camera 201 has a field of view 1401 overlapping with that of the second camera 202. However, the third and the fourth cameras 203 and 204 each have the field of view overlapping with none of the fields of view of the other cameras.

Figure 15:
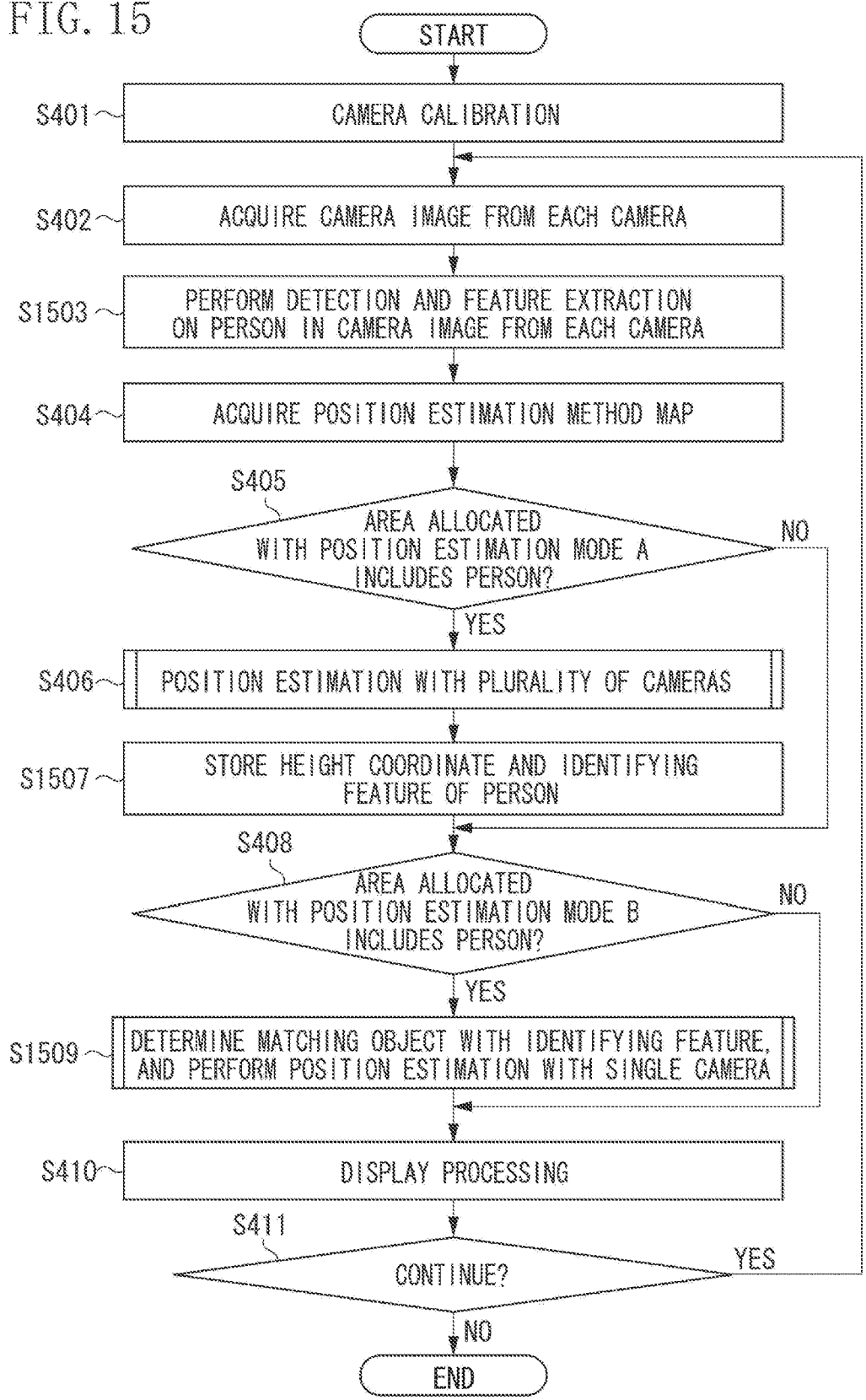
FIG. 15 is a flowchart illustrating an example of a procedure of acquiring a three-dimensional position of the object, according to the second exemplary embodiment.

FIG. 15 is a flowchart illustrating processing according to the present exemplary embodiment. The processing that is the same as that in the flowchart illustrating in FIG. 4 is denoted with the same reference numeral, and the description thereof will be omitted.

In step S1503, the object detection unit 102 detects a person in the camera image acquired in step S402, and the identifying feature extraction unit 1303 extracts the identifying feature from the person thus detected.

In step S1507, the object attribute acquisition unit 104 stores the height coordinate of the person and the identifying feature of the person in the object information storage unit 107, as the object information.

In step S1509, the object position estimation unit 108 executes processing that is partially different from that in step S409 in FIG. 4. The processing in step S1509 is described in detail below.

FIG. 16 is a flowchart illustrating in detail a procedure of the processing executed by the object position estimation unit 108 in step S1509.

First of all, in step S1601, the matching object recognition unit 109 acquires the height coordinate of each person in the area allocated with the position estimation mode B. Specifically, the identifying feature of the person stored in the object information storage unit 107 together with the height coordinate of a person is compared with the identifying feature extracted from the person in the area allocated with the position estimation mode B. Then, the persons with the identifying features the similarity of which is equal to or higher than a threshold is regarded as the same person. Thus, the height coordinate is acquired for the person. In the present exemplary embodiment, a cosine distance is used for the similarity of the RGB color feature. When there is a plurality of identifying features the similarity of which is equal to or higher than the threshold, the height coordinate is acquired for the person with the one of such identifying features that is extracted at the earliest time point. The object information storage unit 107 might not store therein an identifying feature as one of the identifying features a similarity of which is equal to or higher than the threshold. In such a case, it is regarded that the object information storage unit 107 stores no height coordinate of the person that is the same as that in the area allocated with the position estimation mode B. Thus, no height coordinate of the person is acquired. Subsequent steps S702 and S703 are the same as those in FIG. 7, and thus the description thereof is omitted.

In the present exemplary embodiment, in step S1601, the matching object recognition unit 109 determines the matching person by using the identifying feature of the person. Alternatively, the configuration according to the first exemplary embodiment may be used in combination. More specifically, the matching person may be determined by using both the identifying feature of the person and the tracking.

As described above, in the present exemplary embodiment, the matching person is determined by using the identifying feature of a person. Thus, the matching person can be identified even when the cameras arranged, as illustrated in FIG. 14, include a camera with the field of view overlapping none of the fields of view of the other cameras. Thus, the cameras can be more freely arranged. Furthermore, the number of arranged cameras can be reduced because the arrangement in which the cameras have their fields of view overlapping each other is less significant. In particular, the 3D position can be estimated with higher accuracy in a case where a person is difficult to track such as a case where the monitoring area is crowded with persons other than the tracking target.

In the present exemplary embodiment, an object detection result obtained with a camera is input to both the object attribute acquisition unit 104 and the object position estimation unit 108. Alternatively, the result may be input to only one of the object attribute acquisition unit 104 and the object position estimation unit 108. For example, the object detection result obtained with one camera may be input to the object attribute acquisition unit 104, while the object detection result obtained with another camera is input to the object position estimation unit 108. Further a configuration may be employed in which results of some of the cameras are input to any one of the object attribute acquisition unit 104 and the object position estimation unit 108, and results of the remaining one of the cameras are input to both the object attribute acquisition unit 104 and the object position estimation unit 108.

A third exemplary embodiment of the disclosure is described below. In the present exemplary embodiment, only the differences from the first exemplary embodiment are described.

FIG. 17 is a flowchart illustrating processing according to the present exemplary embodiment. The processing that is the same as that in the flowchart illustrating in FIG. 4 is denoted with the same reference numeral, and the description thereof will be omitted.

Processing in step S1704 is basically the same as that in step S406 in FIG. 4. Still, in step S1704, the processing executed for a person in the area allocated with the position estimation mode A in step S406 in FIG. 4 is executed on persons in all areas. Thus, when the processing in step S1704 is executed, there might be a person for which no matching person can be found with any combination between cameras. The 3D position is not estimated for such a person.

In step S1705, the object attribute acquisition unit 104 stores the height coordinate of a person as the object information in the object information storage unit 107 together with the tracking label.

Processing in the subsequent step S1706 is basically different from that in step S409 in FIG. 4. In step 1706, the object position estimation unit 108 executes the processing, which is executed on each person in the area allocated with the position estimation mode B in step S409 in FIG. 4, on a person for which no matching person is found with any combination between cameras in step S601. The person for which no matching person can be found in any combination between cameras is a person that is detected only with a single camera because the person is present in a monitoring area where the fields of view of the plurality of cameras do not overlap, detection failure is caused, or the person is hidden by an object. Thus, in step S1706, the object position estimation unit 108 executes processing that is the same as that in FIG. 7 on such a person to estimate the 3D position of the person.

As described above, in the present exemplary embodiment, the 3D position can be estimated for a person that has been detected by a single camera alone, and the 3D position can be estimated with higher accuracy. With the processing in step S1706 in FIG. 17 executed on a person that is not detected by a plurality of cameras, the 3D position can be estimated for a person for which the 3D position detection with a plurality of cameras has failed. Thus, failure to estimate the 3D position can be reduced.

Other Exemplary Embodiments

In the first to the third exemplary embodiments, the object attribute acquisition unit 104 obtains the height of an object by performing image analysis to obtain a 3D position. Alternatively, the height of an object may be obtained by other methods such as that using a range sensor and the like. In such a case, the object attribute acquisition unit 104 obtains the height coordinate of an object by receiving a range image from the range sensor. In such a configuration in which the camera and other sensors can be used in conjunction, the 3D position can be estimated more accurately with the camera by using information obtained by a device other than the camera.

In the second exemplary embodiment, the object attribute acquisition unit 104 obtains the height of an object by performing image analysis to obtain a 3D position. Alternatively, the height of each object may be measured in advance and stored in an external database together with the identifying feature to be read out in the processing, so that the measurement by the range sensor and the like needs not to be performed.

For example, information on the identifying feature and the height coordinate of a person may be accumulated in a database to be used for facial recognition or personal authentication. In such a case, the matching object recognition unit 109 compares the identifying feature extracted from the camera image acquired by the image acquisition unit 101 and the identifying feature accumulated in the database. Thus, no device for measuring the height of the object is required for estimating the 3D position. Thus, a higher degree of freedom can be achieved for the arrangement, the system, and the like of cameras. Furthermore, the arrangement in which the cameras have their fields of view overlapping each other is less significant for estimating the three-dimensional position, and thus the number of cameras arranged in the monitoring area can be reduced.

The aspect of the disclosure may be implemented by processing in which a program that implements one or more functions of the exemplary embodiments described above is supplied to a system or a device via a network or a storage medium, and one or more processors in the computers in the system or the device read out and execute the program. Furthermore, the aspect of the embodiments may be implemented with a circuit (for example, an application specific integrated circuit (ASIC)) for implementing the one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the aspect of the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-235044, filed Dec. 1, 2015, which is hereby incorporated by reference herein in its entirety.

What is claimed is:

1. An image processing device comprising:
one or more processors; and
one or more memories coupled to the one or more processors, the memories having stored thereon instructions which, when executed by the one or more processors, cause the device to:
detect an object from an image captured by each of a plurality of image capturing devices;
determine whether an object of interest is detected by at least two image capturing devices or a single image capturing device in the image capturing devices;
estimate, when the object of interest is detected by the at least two image capturing devices, a three-dimensional position and information on a height of the object based on a detected position where the object of interest is detected in an image captured by each of the at least two image capturing devices and positions and orientations of the at least two image capturing devices; and
estimate, when the object of interest is detected by the single image capturing device in the image capturing devices, the three-dimensional position of the object of interest based on a detected position where the object of interest is detected in an image captured by the single image capturing device, a position and an orientation of the single image capturing device, and the estimated information on the height.

2. The image processing device according to claim 1, when executed by the one or more processors, further cause the device to: identify, when the object of interest is detected by the single image capturing device, information on a height of the object detected by the single image capturing device, from the estimated information on the height,
use the information, on the identified height of the object.

3. The image processing device according to claim 2, when executed by the one or more processors, further cause the device to:
track an object detected from the image captured by each of the image capturing devices; and
identify the information on the height of the object detected by the single image capturing device, from the estimated information on the height, based on a tracking result.

4. The image processing device according to claim 2, when executed by the one or more processors, further cause the device to: extract respective features from detected objects; and
identify the information on the height of the object detected by the single image capturing device, from the estimated information on the height, by comparing the extracted respective features.

5. The image processing device according to claim 2, when executed by the one or more processors, further cause the device to: use, when the information on the height of the object detected by the single image capturing device is not identified, information on a height set in advance.

6. The image processing device according to claim 1, when executed by the one or more processors, further cause the device to: determine whether the object of interest is detected by at least two image capturing devices in the plurality of image capturing devices, by determining whether the object detected by one of the plurality of image capturing devices is detected by another one of the plurality of image capturing devices based on the positions and the orientations of the image capturing devices.

7. The image processing device according to claim 6, when executed by the one or more processors, further cause the device to: store area information, and determine whether the object of interest is detected by at least two image capturing devices in the plurality of image capturing devices, by referring to the area information, whether the object detected by one of the plurality of image capturing devices is detected by another one of the plurality of image capturing devices, the area information representing an area where an image captured by the one of the plurality of image capturing devices overlaps with an image captured by the another one of the plurality of image capturing devices based on the positions and the orientations of the image capturing devices.

8. An image processing method comprising:
detecting an object from an image captured by each of a plurality of image capturing devices;
determining whether an object of interest is detected by at least two image capturing devices or a single image capturing device in the image capturing devices;
estimating, when the object of interest is detected by the at least two image capturing devices, a three-dimensional position and information on a height of the object based on a detected position where the object of interest is detected in an image captured by each of the at least two image capturing devices and positions and orientations of the at least two image capturing devices; and
estimating, when the object of interest is detected by the single image capturing device in the image capturing devices, the three-dimensional position of the object of interest based on a detected position where the object of interest is detected in an image captured by the single image capturing device, a position and an orientation of the single image capturing device, and the estimated information on the height.

9. The image processing method according to claim 8, further comprising identifying, when the object of interest is determined to have been detected by the single image capturing device, information on a height of the object detected by the single image capturing device, from the information on the estimated height,
wherein the estimating uses the identified information on the height of the object.

10. The image processing method according to claim 9, further comprising tracking an object detected from the image captured by each of the image capturing devices,
wherein the identifying identifies the information on the height of the object detected by the single image capturing device, from the information on the estimated height, based on a tracking result obtained by the tracking.

11. The image processing method according to claim 9, further comprising extracting respective features from objects detected by the detecting,
   wherein the identifying identifies the information on the height of the object detected by the single image capturing device, from the information on the height estimated by the estimating, by comparing the extracted respective features.

12. The image processing method according to claim 9, wherein the estimating uses, when the identifying does not identify the information on the height of the object detected by the single image capturing device, information on a height set in advance.

13. The image processing method according to claim 8, wherein the determining determines whether the object of interest is detected by at least two image capturing devices in the plurality of image capturing devices, by determining whether the object detected by one of the plurality of image capturing devices is detected by another one of the plurality of image capturing devices based on the positions and the orientations of the image capturing devices.

14. A non-transitory storage medium storing therein a program causing a computer to perform a method comprising:
   detecting an object from an image captured by each of a plurality of image capturing devices;
   determining whether an object of interest is detected by at least two image capturing devices or a single image capturing device in the image capturing devices;
   first estimating, when the object of interest is detected by the at least two image capturing devices, a three-dimensional position and information on a height of the object based on a detected position where the object of interest is detected in an image captured by each of the at least two image capturing devices and positions and orientations of the at least two image capturing devices; and
   second estimating, when the object of interest is detected by the single image capturing device in the image capturing devices, the three-dimensional position of the object of interest based on a detected position where the object of interest is detected in an image captured by the single image capturing device, a position and an orientation of the single image capturing device, and the first estimated information on the height.

15. The non-transitory storage medium according to claim 14, further comprising identifying, when the object of interest is determined to have been detected by the single image capturing device, information on a height of the object detected by the single image capturing device, from the first estimated information on the height,
   wherein the second estimating uses the information, on the height of the object, identified by the identifying.

16. The non-transitory storage medium according to claim 15, further comprising tracking an object detected from the image captured by each of the plurality of image capturing devices,
   wherein the identifying identifies the information on the height of the object detected by the single image capturing device, from the information on the first estimated height, based on a tracking result obtained by the tracking.

17. The non-transitory storage medium according to claim 15, further comprising extracting respective features from detected objects,
   wherein the identifying identifies the information on the height of the object of interest detected by the single image capturing device, from the information on the first estimated height, by comparing the extracted respective features.

18. The non-transitory storage medium according to claim 15, wherein the second estimating uses, when the identifying does not identify the information on the height of the object detected by the single image capturing device, information on a height set in advance.

19. The non-transitory storage medium according to claim 14, wherein the determining determine whether the object of interest is detected by at least two image capturing devices in the image capturing devices, by determining whether the object detected by one of the plurality of image capturing devices is detected by another one of the plurality of image capturing devices based on the positions and the orientations of the image capturing devices.

* * * * *